(12) United States Patent
Breckenridge (10) Patent No.: US 9,098,801 B2
(45) Date of Patent: Aug. 4, 2015

(54) TIME SERIES CLASSIFYING MEMORY, SYSTEMS AND METHODS

(71) Applicant: John L. Breckenridge, Washington, DC (US)

(72) Inventor: John L. Breckenridge, Washington, DC (US)

( * ) Notice: Subject to any disclaimer, the term of this patent is extended or adjusted under 35 U.S.C. 154(b) by 186 days.

(21) Appl. No.: 13/717,653

(22) Filed: Dec. 17, 2012

(65) Prior Publication Data

US 2014/0172761 A1    Jun. 19, 2014

(51) Int. Cl.
*G06E 1/00* (2006.01)
*G06F 12/00* (2006.01)
*G06N 3/02* (2006.01)

(52) U.S. Cl.
CPC ........................................ *G06N 3/02* (2013.01)

(58) Field of Classification Search
None
See application file for complete search history.

(56) References Cited

U.S. PATENT DOCUMENTS

| | | | |
|---|---|---|---|
| 5,737,486 A | 4/1998 | Iso | |
| 7,430,546 B1 * | 9/2008 | Suri | 706/16 |
| 2005/0015351 A1 * | 1/2005 | Nugent | 706/33 |
| 2009/0132452 A1 * | 5/2009 | Adkins | 706/25 |
| 2013/0204820 A1 * | 8/2013 | Hunzinger et al. | 706/25 |

* cited by examiner

*Primary Examiner* — Alan Chen (57) ABSTRACT

A time series classifying memory includes an enumerated group of synapses. Each synapse of the group has a junction including pre-synaptic emitters communicating with post synaptic receptors. A single pathway is input to each synapse of the group, and when innervated, stimulates the junctions. Each successive synapse has successively more post synaptic receptors according to a fixed ratio. At each junction, quanta of neurotransmitter emitted from the emitters bind with available receptors. When all the receptors at a junction have been bound, the junction goes refractory. The synapse adjacent to the last junction to go refractory is marked. During a training mode the mark is a Long Term Potentiation (LTP) mark. During a live mode the mark is a Short Term Potentiation (STP) mark. The input is classified upon successful correlation of the LTP mark with the STP mark. A clock operable with synaptic matrix models this process.

10 Claims, 5 Drawing Sheets

TIME SERIES CLASSIFYING MEMORY, SYSTEMS AND METHODS

1.1 RELATED U.S. PATENT DOCUMENTS

This utility patent application claims the benefit of U.S. Provisional Patent Application Ser. No. 61/576,375, filed Dec. 16, 2011.

1.2. FIELD OF THE INVENTION

The invention relates to a time series classifying memory (TSCM), systems and methods. More specifically, the present invention relates to a time series classifying memory featuring inputs having refractory temporal inputs which classify temporal properties of incident input stimuli.

1.3. DESCRIPTION OF RELATED ART

Existing artificial neurons apply weights to inputs, sum the weights and activate according to an activation function based on a threshold. Memory is dependent on networks of these artificial neurons which via feedback adjust the weights of the neurons in the network. Individual artificial neurons generally do not exhibit memory properties and cannot classify time series events as inputs.

Thus it would be highly desirable to provide a time series classifying memory (TSCM) in which an individual (TSCM) features inputs having refractory temporal inputs which classify temporal properties incident input stimuli.

1.4. SUMMARY OF THE INVENTION

A time series classifying memory includes an enumerated group of synapses. Each synapse of the group has a junction including pre-synaptic emitters communicating with post synaptic receptors. A single pathway is input to each synapse of the group, and when innervated, stimulates the junctions. Each successive synapse has successively more post synaptic receptors according to a fixed ratio multiplied by the number of synaptic receptors in the previous synapse. At each junction, quanta of neurotransmitter emitted from the emitters bind with available receptors. When all the receptors at a junction have been bound, the junction goes refractory.

The synapse adjacent to the last junction to go refractory is marked (alternatively, the synapse belonging to the last junction to go refractory could be marked). During a training mode the mark is a Long Term Potentiation (LTP) mark. During a live mode the mark is a Short Term Potentiation (STP) mark. The input is classified upon successful correlation of the LTP mark with the STP mark. A clock operable with synaptic matrix models this process.

1.6. DETAILED DESCRIPTION OF THE INVENTION

A time series classifying memory includes an enumerated group of synapses. Each synapse of the group has a junction including pre-synaptic emitters communicating with post synaptic receptors. A single pathway is input to each synapse of the group, and when innervated, stimulates the junctions. Each successive synapse has successively more post synaptic receptors according to a fixed ratio multiplied by the number of synaptic receptors in the previous synapse. At each junction, quanta of neurotransmitter emitted from the emitters bind with available receptors. When all the receptors at a junction have been bound, the junction goes refractory.

The synapse adjacent to the last junction to go refractory is marked. During a training mode the mark is a Long Term Potentiation (LTP) mark. During a live mode the mark is a Short Term Potentiation (STP) mark. The input is classified upon successful additive correlation of the LTP mark with the STP mark. A clock operable with synaptic matrix models this process.

A synaptic potential is developed as the post synaptic receptors bind with the quanta of neurotransmitter emitted by the pre-synaptic emitters. After all available receptors for the synapse have been bound with neurotransmitter, the synaptic potential for that synapse returns to a state of depression, i.e., the synapse goes refractory. This feature is used to assist in classifying temporal properties of incident stimuli, thereby facilitating temporal aspects of learning, memory and behavior of the system.

Each synapse has a unique number of receptors which is defined by a specific ratio times the number of receptors in the previous synapse. Thus each successive synapse takes successively longer time to go refractory according to a time ratio defined by the specific number of receptors ratio.

Preferably the time ratio is equal for each synapse in a group of synapses of the TSCM. The refractory time for a synapse can be defined as a cutoff time ($T_{CO}$). Like the notes on a piano keyboard that represent pitch in the form of vibrating strings having ever increasing length, the TSCM synapses have processes and/or circuitry that record duration time of a stimulus via geometrically increasing refractory temporal inputs, each synapse having its own duration cutoff time $T_{CO}$. The circuitry contemplated herein includes but is not limited to electrical/electronic digital or analog circuitry, chemical circuitry, biochemical circuitry, molecular circuitry, biomolecular circuitry, or different combinations thereof.

The excitability, i.e., potential activity P, of each synapse S can be determined by the following relations.

For $t \leq T_{CO} S_P =$ active  (1)

For $t > T_{CO} S_P =$ inactive  (2)

When the stimulus is removed the active synapse immediately adjacent to the last synapse to go inactive (refractory) is marked as LTP in training mode or STP in live mode.

Similar to the notes on a piano keyboard, the increasing $T_{CO}$ associated with successive synapses are arranged in an equal temperament fashion. That is to say, the $T_{CO}$ may increase by sextaves, octaves, decades, dodecades, or the like, each step increasing by an equal percent difference from the previous step. For instance, analogous to the notes of a piano, the $T_{CO}$ may double per octave.

An octave may be divided into 12 equal parts. It should then be understood that $T_{CO}$ of any adjacent synapses differ from each other by a factor of $2^{1/12}$, i.e., approximately six percent. That is to say, the synaptic $T_{CO}$ increase in equal temporal ratios, i.e., geometrically. The aforementioned series increases for a predetermined number of octaves to cover a desired range of stimulus time durations.

The $T_{CO}$ range repeats itself a predetermined number of times in Groups G, each Group G being a data bit that represents the total duration of the stimulus during the activity time period of that synapse Group. In the exemplary Morse code configuration of neuromorphs (TSCMs connected to TLUs) 400 shown in FIG. 4, the first time filter has a 20 msec duration and the last has a 2 second duration which is 100 times the 20 msec duration, therefore given the octave configuration of synapses, approximately 2**7=128 synapses are required to cover the durational time range. This necessitates approx 7 octaves=12 "notes" (12 is merely exemplary, the number could be more or less than 12) each=84 "notes" total. (a "note" is a slice of time that a given syn can be active before reaching $T_{co}$ i.e., going refractory, the higher the "note", the longer the time slice, and all "notes" start at time $t_0$. The exemplary TSCM is going to have 7 data bits, i.e., 7 Groups (G1-G7) of storage therefore 84*7=588 synapses per TSCM are required. In the Morse code example: 26 alpha characters+10 numeric characters+10 special characters=46 TSCMs; 588 times 46=27048 total synaptic connections=3.4 kbytes assuming 1 Long Term Potentiation (LTP) mark per synapse. Output of the TLUs are routed to a data selector 402 that selects a predetermined character based on the classified output presented to the data selector 402 by the TLUs. The data selector 402 routs the selected character to a display unit 404 that can be read by a user.

Training Logic

Figure 1:
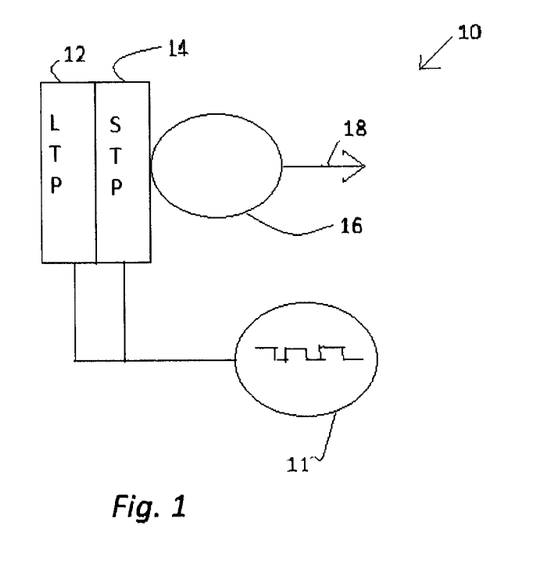
FIG. 1 is a block diagram of a TSCM of the time series classifying memory according to the present invention.

To train a TSCM 10 shown in FIG. 1, it is placed in a training mode. During the training mode, all that is required is to allow a stimulus to be applied to the synapses. When the stimulus is removed the active synapse immediately adjacent to the last synapse to go inactive (refractory) is marked as LTP. This process is repeated for each Group (G1-G7). The resultant LTP synaptic configuration records an archetypical stimulus pattern against which playback or subsequent stimulus patterns are compared. A "stimulus pattern" is defined as a time series of stimulus present and stimulus not present states. The TSCM is trained to associate bursts of stimulus activity with specific synapses in the memory.

Timing and sequencing of the stimulus is remembered on the progressively increasing synapses which have correspondingly progressively increasing duration $T_{CO}$'s. For each synapse, once $T_{CO}$ has elapsed that said specific synapse is depressed to assist later repetition, recognition, or recall of the stimulating event. Remaining synapses in the group after the last synapse to go $T_{CO}$ before the stimulus is removed are hyperpolarized, i.e., made LTD to prevent false stimulus duration recall in the future.

With respect to the stimulatory inputs at the synapses, when a synapse goes $T_{CO}$ it can no longer respond to the incident stimulus thus that synapse is considered to be in a refractory state. In this manner, after the stimulus is momentarily removed, all synapses that have gone $T_{CO}$ during incidence of the stimulus are transitioned to a refractory state thereby ignoring further stimulus during training. After the momentary absence of the stimulus, when the stimulus is applied again, a subsequent Group of synapses responds, as the previous Group has been trained to the previous stimulus duration. Further stimulatory activity is then responded to by subsequent time range Groups and the aforementioned process repeats itself until the training session is terminated, or until the TSCM runs out of time duration synapse groups G. It should be understood that the algorithm for the aforementioned synaptic processes stores time durations and numerical order of occurrence of behavioral patterns in the TSCM for later recall or later recognition.

Memory Operations

The memory structure of the inventive TSCM has at least a sensory recognition mode, and an internal recall mode. The connections in these two modes are slightly different. In the recall/mimic mode, the trained TSCM responds to stimuli coming from recall TSCMs or external recall stimuli. Responses include replaying the stimulus pattern exactly as it was recorded in LTP-LTD; replaying the stimulus pattern slower than the LTP-LTD recorded stimulus pattern; or replaying the stimulus pattern faster than the LTP-LTD recorded stimulus pattern.

Figure 2:
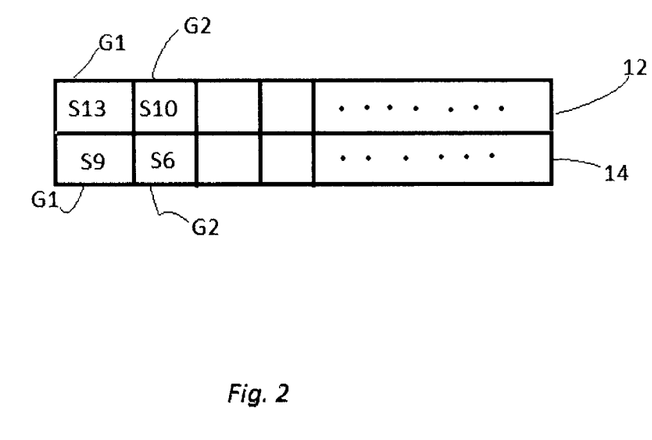
FIG. 2 is a block diagram detailing the refractory temporal memory synapses, according to the present invention.

The exact replay can be achieved because the time ratios of the durations G1:G2:G3:G4:G5:G6:G7 are memorialized in the LTP mark recorded for each group, i.e., the trained TSCM merely plays back its behavioral response to the stimulus according to the LTP symbols for each Group. The LTP register 12 and STP register 14 are shown in FIGS. 1 and 2.

The slower or faster replay is facilitated by the fact that the duration times are equally divided "notes", i.e., unique durations on the time scale, to play a stimulus pattern slower all that has to be done is maintain the "durational interval" i.e., difference between successive "notes" in the recorded LTP symbol by subtracting or adding an integer to that difference in order to speed up or slow down the playback stimulus pattern. The aforementioned operation retains the ratios between successive Groups. This can be achieved by marking the synapses with temporary STP symbols which are then clocked out, i.e., played back upon memory recall stimulation of the TSCM.

Memory Storage Algorithm

A naturally occurring biological neuron may have upwards of 5000 synapses. So too does the inventive Neuromorphic system. The memory storage algorithm of the inventive Neuromorphic system may be implemented in hardware, firmware, software, wetware, or any combination of the aforementioned implementation media. For example, in software or firmware, neuron components, i.e., synapses, soma, axons, and the like may be represented as mapped memory locations.

An exemplary case is described wherein there are approximately 4116 synapses in the TSCM. The 4116 synapses are divided into approximately 7 groups of 588 synapses. For each group of 588 synapses, a unique time $T_{CO}$ is associated with each of the synapses. The first synapse has a duration cutoff time $T_{CO_1}$, the second synapse has a duration cutoff time $T_{CO_2}$, the third synapse has a duration cutoff time $T_{CO_3}$, and the like. The 588th synapse has a duration cutoff time $T_{CO_{588}}$. The duration cutoff times $T_{CO_x}$ increase according to the synapse number x.

Therefore it is preferable to overlap the synaptic time durations such that the activity periods begin at the same time, i.e., when the stimulus is first applied. During the time that the stimulus is applied, shorter synaptic time durations will expire causing their associated synapses to go refractory, while the synapse adjacent to the last synapse who's $T_{CO}$ has been reached when the stimulus stops, accurately reflects the duration of the stimulus. In the aforementioned exemplary embodiment the time constants increase according to $2^{x/12}$, where it takes 12 steps to double the synaptic temporal duration, and x is any particular synapse in the series of 588 synapses.

Memory Recognition Algorithm

An additive correlation is performed between the LTP mark and STP mark. The additive correlation differs from a typical correlation or convolution in the respect that the LTP mark copies itself and propagates through the synapses until it encounters an STP symbol upon which the LTP mark (symbol) is added to the STP symbol at that synapse location. This process is repeated for each of the synapse Groups, e.g., (exemplary G1-G7). Thus recognition occurs when for each Group there exists a synapse having the symbol LTP+STP. For example, if the LTP symbol is 1 and the STP symbol is 2, then the recognition symbol is LTP+STP=3.

Pattern recognition mode includes a stochastic recognition submode, an exact recognition submode, and a relaxed constraint recognition submode. It should be understood that the recognition modes discussed herein are plausibly biomimetic, i.e., replicative of actual biological processes, although practice of the inventive method does not require the inventive submodes to be biomimetic. The stimulus is routed to a first synaptic region of the exemplary TSCM, the first synaptic region being capable of transitioning to a long term potentiated state thereby facilitating long term memory as described above. Additionally, the stimulus is routed to a second synaptic region of the exemplary TSCM, the second synaptic region only recording fleeting instances of stimuli because it is limited to a short term potentiated state. The Group structure of the LTP first synaptic region is replicated in the STP second synaptic region of the TSCM.

The TSCM has mechanisms which compare synaptic activity of the Groups in the second synaptic region to synaptic activity of corresponding Groups in the first synaptic region storing archetypical stimulus patterns in order to facilitate recognition of a given stimulus pattern.

The first synaptic region stores the ratios of successive stimulus durations, e.g., the ratios G2:G1, G3:G2, G4:G3, G5:G4, G6:G5, G7:G6 are stored in the TSCM. These ratios can be compared to corresponding Group ratios in the second synaptic region to determine whether a pattern of stimuli has been matched, i.e., recognized.

Advantageously, because of the geometric progressive structure of the Group synapses, i.e., for each group, time bins are separated by equal time ratio, the ratios are determined merely by taking the difference in the synapse number from Group to Group, e.g., G2:G1 is equal to the synapse number of G2 minus the synapse number of G1, etc. Thusly, ratio comparisons between the first and second synaptic regions reduce to comparing synapse number differences between the two Group regions.

In the stochastic recognition mode only the signs of the first and second corresponding Group regions must match between the stored archetype and the fleeting stimulus and can be defined by the relation, $$\sum_{i=1}^{i=maxbit-1} SGN((G(LTP)_{i+1} - G(LTP)_i) - (SGN((G(STP)_{i+1} - G(STP)_i)) = 0 \quad (3)$$

In the exact recognition submode, not only the intervals of the Group differences must match between the archetype and the fleeting stimulus, but the exact "notes" must match, i.e., analogous to perfect pitch, the stimulus must match the archetype in "perfect time" FIG. 2 shows a register mechanism in which the "fleeting" stimulus is compared to the archetype. Note that when the stimulus is applied LTP synapses are temporarily changed to STP synapses as soon as $T_{co}$ has elapsed. When the stimulus is removed from the TSCM, the STP synapses transition back to LTP and a count of the transitions is performed thus making the difference between the stimulus time and the archetype time known.

Similarly LTD synapses are temporarily changed to STP if the stimulus duration extends into LTD territory. When the stimulus is removed from the TSCM, the STP transition back to LTD thus similarly exposing the count which is added to the STP-LTP transition count to get duration of the applied stimulus.

The aforementioned procedure is performed on each Group. In the exact recognition submode, the exact "note" must match the "note" of the archetype for each Group. Subsequently the group intervals of the stimulus are checked for an exact match against the Group intervals of the archetype. Exemplary calculations for the exact recognition submode can be defined by the relation, $$\sum_{i=1}^{i=maxbit-1} (G(LTP)_{i+1} - G(LTP)_i) - (G(STP)_{i+1} - G(STP)_i) = 0 \quad (4)$$

In an exemplary relaxed constraint recognition submode the above process is carried out except that the "note" for each Group does not have to match; the intervals between Groups should match but don't have to match exactly because there exists an error interval difference $\epsilon_i$ that is tolerated to achieve a match. Relaxed constraint recognition calculations can be defined by the relation, $$\sum_{i=1}^{i=maxbit-1} (G(LTP)_{i+1} - G(LTP)_i) - (G(STP)_{i+1} - G(STP)_i) \leq \epsilon_i \quad (5)$$

For greater confidence in the match, the relaxed constraint recognition submode may include the sign matching of the stochastic recognition submode. There is contemplated a plethora of relaxed constraint recognition submodes, some of which may include Markov chain analysis, Bayesian analysis, error interval difference vectors, and the like.

An exemplary artificial neuron utilizing the inventive TSCM includes a matrix which records the input stimuli in marked temporal bins thus facilitating long term and short term potentiation at the inputs of the artificial neuron.

Time Series Classifying Memory $$\begin{bmatrix} 2 & 0 & 0 & 0 \\ 0 & 2 & 0 & 0 \\ 1 & 0 & 0 & 0 \\ 0 & 1 & 0 & 0 \end{bmatrix} = SynapticMatrix_{LTD} SynapticMatrix_{STD} \quad (6)$$

is a quick way to mimic the inputs. Each row is 1.059 times the previous row starting at the bottom row. The firing rule is:

$$\sum_{j=0}^{j=jmax-1} (i_{LTD_j} - i_{LTD_{j+1}}) - (i_{STD_j} - i_{STD_{j+1}}) \geq 0 \wedge \leq 0 \pm 3\sigma \quad (7)$$

An optional epochal learning rule may be applied for all columns j where $i_{LTD} - i_{STD} \approx C$, $\eta$ being the learning rate.

$$\sum_{stdbias=0}^{stdbias=stdbias+\eta} stdbias \qquad (8)$$

$$val_{i_{STD} \pm stdbias} = val_{i_{STD}} \qquad (9)$$

The max permissible value for η is determined by the extreme values of the training dataset.

Example, in an already trained matrix where the firing rule result is within 3σ of 0, $$\begin{bmatrix} 1 & 0 & 0 & 0 \\ 2 & 0 & 0 & 0 \\ 0 & 2 & 0 & 0 \\ 0 & 1 & 0 & 0 \end{bmatrix} = SynapticMatrix_{LTD} SynapticMatrix_{STD} \qquad (10)$$

$$\begin{bmatrix} 2 & 0 & 0 & 0 \\ 0 & 2 & 0 & 0 \\ 1 & 0 & 0 & 0 \\ 0 & 1 & 0 & 0 \end{bmatrix} = SynapticMatrix_{LTD} SynapticMatrix_{STD} \qquad (11)$$

same format for spatial extent (frequency).

Moreover, robustness in pattern recognition may be enhanced by assuming the STP temporal values are mean values and synthesizing a normal or alternatively skewed distribution of temporal values acceptable as a match therefrom. σ values could be adjusted via feedback from a critic module that monitors the "correctness" of the output of the TSCM.

For any given application feature extraction and matching are performed by the TSCM. What makes the TSCM different from the typical artificial neuron discussed above is that pre and post-synaptic processes are modeled in the TSCM. These processes include quanta of neurotransmitter being repetively transported to predefined limited amounts of neuroreceptors per each synapse.

For each synaptic junction, in a successive manner, when the predefined limited amount of neuroreceptor has been used up, that synapse goes into a refractory, inactive state. This successive refractory process can be used to accurately time the duration of a stimulus. Such timing is facilitated if there is a fixed ratio of neuroreceptor increase per each successive synaptic connection.

Practical implementation of the model uses a multi-synaptic input comprised of a pair of registers; a Long Term Potentiation LTP register 12, and a Short Term Potentiation STP register 14. When a stimulus is applied and then removed, the last synapse junction to go refractory is marked with an index number indicating that junction number, e.g., S13 in group G1, S10 in group G2 LTP 12, and S9, S6, the same groups in the STP register 14.

During training the LTP register is filled with synapse index numbers. During live mode the STP register is filled with synapse index numbers. The contents of the LTP register form the template series which is then compared against the contents of the STP register for matching. Register positions represent the synapse group G being stimulated and are equivalent to columns in the exemplary matrices shown in relations (10) and (11). The register contents, i.e., synapse index number represents the actual synapse being stimulated and is equivalent to the row number of exemplary matrices shown in relations (10) and (11). Non-relaxed constraint pattern recognition (classification) occurs when for all synapse groups $G_n$ $$LTP-STP=CONSTANT \qquad (12)$$

When the aforementioned relaxed constraint recognition algorithms are in force, eqn. (12) is modified accordingly to account for the permissible variance in the LTP–STP differences across synapse groups $G_n$.

Figure 3:
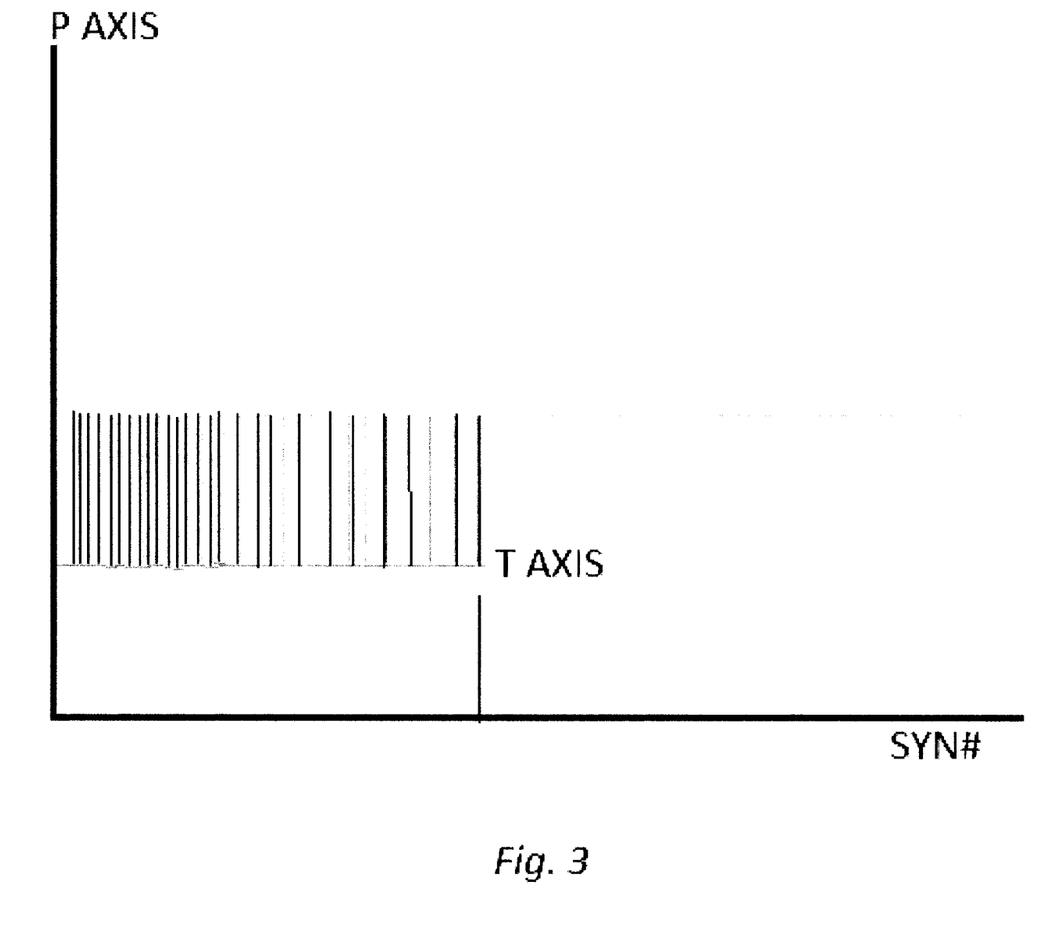
FIG. 3 is a timing diagram showing timing pulses of the clock of a TSCM according to the present invention.
Figure 4:
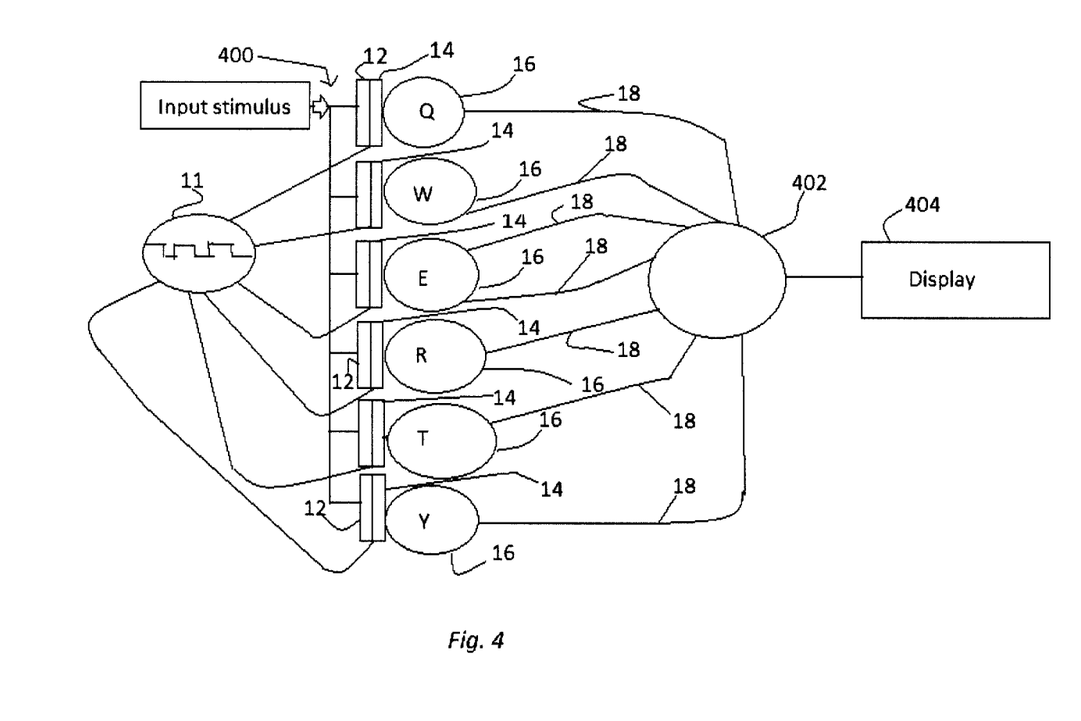
FIG. 4 is a block diagram showing the TSCM in a neuromorphic system which understands and decodes Morse Code telegraphy, according to the present invention.

If the TSCM is an input portion of a threshold logic unit 16, the TLU can be configured to fire action potentials along axon 18 when the TSCM 10 successfully matches STP patterns to LTP patterns. Conversely, the TLU could be configured to inhibit the firing of action potentials along axon 18 when the TSCM 10 successfully matches STP patterns to LTP patterns. There are a plurality of TLU functions that could be configured responsive to STP–LTP matching, said functions include but are not limited to differential DC, AC of a predetermined frequency and duration, and the like. The pattern matching can be made invariant against time scales if the aforementioned fixed ratio of neuroreceptor increase per each successive synaptic connection is modeled by a synapse index number counter whose count period increases per count according to the fixed ratio, as shown in FIG. 3, (the counter begins counting at the onset of a stimulus and stops counting when the stimulus is removed). As shown in FIG. 4, functionally related TLUs 400 may be clustered together and have a common clock 11 that is initiated when a stimulus is applied to a presynaptic pathway which the functionally related TLUs share.

Figure 5:
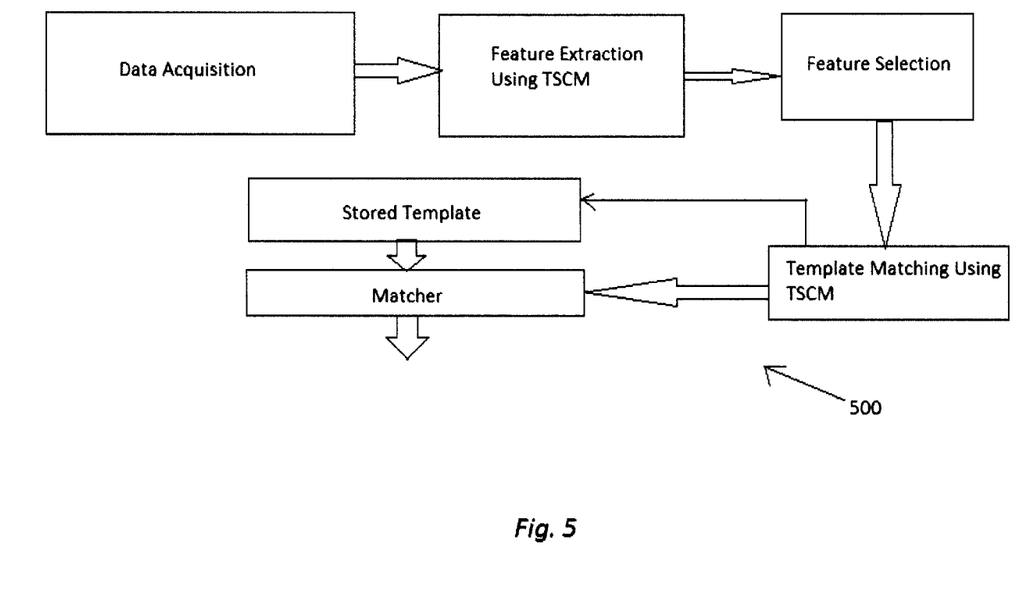
FIG. 5 is a block diagram showing the TSCM in a neuromorphic system which processes keystroke temporal dynamics to facilitate user authentication for security, according to the present invention.

FIG. 5, 500 shows an exemplary keystroke timing recognition application in which training of the TSCM comprises end user keypad/keyboard keystroke entries that generate time series data which are processed by the TSCM. Key duration and digraph metrics are memorialized by the inventive TSCM.

It is contemplated that the herein described invention may be implemented on a processor which may include a distributed processing system, a central processing unit, an FPGA, ASIC, or any combination thereof. The invention may also be stored on non-transitory computer readable medium in the form of instructions executable by a processor, microprocessor, computer, and the like.

Although the described invention has been with particular reference to the exemplary embodiments presented herein, it should be apparent that other variations and modifications can be made within the spirit and scope of this invention. The invention, however, is defined by the claims appended below.

Accordingly it is to be understood that the drawings and the description provided herein are proffered by way of example, to facilitate comprehension of the invention, and should not be construed to limit the scope thereof.

I claim:

1. A time series classifying memory comprising:
   an enumerated group of synapses, each synapse of the group having a junction including pre-synaptic emitters communicating with post synaptic receptors, a single pathway being input to each synapse of the group, and when innervated, stimulating the junctions, each successive synapse having successively more post synaptic receptors according to a fixed ratio;
   at each junction, quanta of neurotransmitter being emitted from the emitters, said neurotransmitter quanta binding with available said post synaptic receptors;
   means for changing said each junction to a refractory state when all said post synaptic receptors at said each junction have been bound;

during a training mode, means for marking a synapse adjacent to a last said each said junction gone refractory with a training symbol, said training symbol representing a Long Term Potentiation (LTP) of said adjacent synapse;

during a live mode, means for marking a synapse adjacent to a last said each said junction gone refractory with a live symbol, said live symbol representing a Short Term Potentiation (STP) of said adjacent synapse;

means for performing for each said group an additive correlation operation between said training symbol and said live symbol; and wherein upon successful additive correlation of the training symbol with the live symbol for each said group, said input is classified.

2. The time series classifying memory according to claim 1, further comprising means for increasing geometrically said unique time periods increasing according to the numerical order of said synapse.

3. The time series classifying memory according to claim 2, further comprising means for increasing according to $2^{x/n}$ said geometrically increasing unique time periods where n is the number of steps required to double the time period, and x is a specific synapse number in the series of numerically increasing synapses.

4. The time series classifying memory according to claim 3, wherein said number of steps required to double the time period is twelve.

5. The time series classifying memory according to claim 1, wherein there is a plurality of said groups of said numerically ordered synapses in said time series classifying memory.

6. The time series classifying memory according to claim 5 wherein the groups are ordered in a numerically increasing manner, each group having a monotonically increasing group number, said group numbers representing a sequential order of stimulus durations input to the synapses.

7. The time series classifying memory according to claim 5 wherein a first group of said synapses has extremely short term memory with respect to the remainder of the synapse groups.

8. The time series classifying memory according to claim 7 further comprising said first group of synapses having means for propagating stimulus duration memories into the longer term memory synapse groups.

9. A time series classifying memory method comprising the steps of:

enumerating a group of synapses, each synapse of the group having a junction including pre-synaptic emitters communicating with post synaptic receptors;

accepting input from a single pathway to each synapse of the group;

assigning to each successive synapse successively more post synaptic receptors according to a fixed ratio;

stimulating the junctions when said pathway is innervated;

at each junction, emitting quanta of neurotransmitter from the emitters, said neurotransmitter quanta binding with available said post synaptic receptors;

changing said each junction to a refractory state when all said post synaptic receptors at said each junction have been bound;

during a training mode, marking a synapse adjacent to a last said each said junction gone refractory with a training symbol, said training symbol representing a Long Term Potentiation of said adjacent synapse;

during a live mode, marking a synapse adjacent to a last said each said junction gone refractory with a live symbol, said live symbol representing a Short Term Potentiation of said adjacent synapse;

performing a correlation operation between said training symbol and said live symbol; and wherein upon successful correlation of the training symbol with the live symbol said input is classified.

10. The time series classifying memory method according to claim 9, wherein said junction state changing step further comprises the steps of:

counting by successive increments of time, each successive increment being associated with a corresponding successive one of said enumerated synapses, upon transition to a next count said corresponding successive one of said enumerated synapses transitions to said refractory state; and increasing duration of each said successive count by said fixed ratio multiplied by an adjacent previous said successive count.

\* \* \* \* \*